Sept. 17, 1940.  L. HOCKER, JR  2,214,833
ROTARY INTERNAL COMBUSTION ENGINE
Filed Dec. 2, 1938  2 Sheets-Sheet 1

INVENTOR
Lon Hocker Jr.

Sept. 17, 1940.   L. HOCKER, JR   2,214,833
ROTARY INTERNAL COMBUSTION ENGINE
Filed Dec. 2, 1938   2 Sheets-Sheet 2

INVENTOR
Lon Hocker Jr

Patented Sept. 17, 1940

2,214,833

UNITED STATES PATENT OFFICE 2,214,833

ROTARY INTERNAL COMBUSTION ENGINE

Lon Hocker, Jr., St. Louis, Mo.

Application December 2, 1938, Serial No. 243,495

14 Claims. (Cl. 123—14)

This application is a continuation in part of my application of October 17, 1936, Serial No. 106,121, now abandoned.

This invention relates to internal combustion engines of the rotary type in which the power impulse is imparted directly to a rotating piston.

It is an object of my invention to create an engine of this type which will seal the firing chamber first with the compressing face of the rotor and then with the driven face with maximum efficiency and minimum parts.

It is a further object of the invention to produce simultaneously the four phases of the internal-combustion cycle, intake, compression, explosion, and exhaust, in order to provide an approximately constant power impulse in each cylinder and thereby achieve evenness of operation, and a favorable weight-to-horsepower ratio without sacrifice of simplicity.

It is a further object of the invention to utilize the edge of the piston itself for the only cam, thereby avoiding the use of timing gears, camshafts, cranks, etc.

It is a further object of the invention to keep all moving parts and the cylinder walls free from carbon.

It is a further object of the invention to reduce the reciprocating masses to a minimum, in order to minimize weight, inertia, and friction.

It is a further object of the invention to substitute ports for valves, thereby to avoid excess of parts.

It is a further object of the invention to overcome the inertia of the explosive gas on introduction into the cylinder by centrifugal force.

The accompanying illustration is of a type of my invention wherein:

Fig. 10 shows the rotor about 120° advanced from the position of Fig. 1.

Fig. 11 shows the rotor about 60° advanced from the position of Fig. 10.

Fig. 12 shows the rotor about 120° advanced from the position of Fig. 11.

Figure 1:
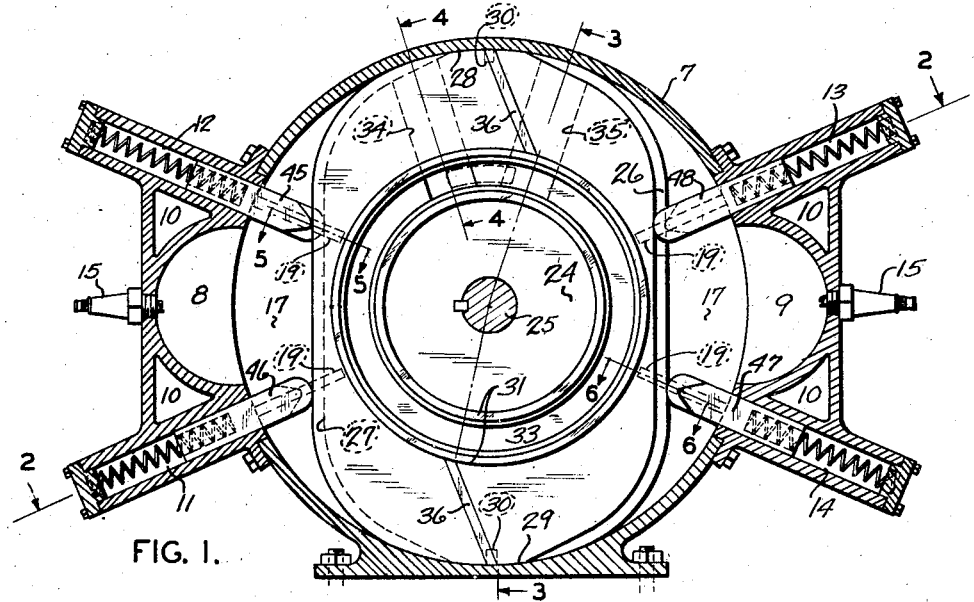
Fig. 1 is a vertical section of the assembled engine substantially in the plane of the front face of the rotor.

In the drawings, a cylinder is shown at 7, with diametrically opposed combustion chambers 8 and 9, fitted with appropriate water jackets 10, each flanked with two gate courses, 11 and 12, and 13 and 14, respectively, and each provided with spark-plugs (or injectors—not shown—for Diesel operation) 15. Cut in the back face, 17, of the cylinder are slots in extension of the gate courses 11, 12, 13, 14 for housing flat seals 19, urged inwardly by appropriate springs, 20. Also cut in the back face, 17, are an exhaust port, 21 and a shaft journal, 22.

An elongated rotor is shown at 24 keyed with the shaft 25, to fit with minimum clearance in the cylinder 7. On one long side it is equipped with a tongue 26 and on the other with a groove, 27. On either end, between the ends of the full tongue and full groove, it is shaped in arcs, 28 and 29, corresponding to that of the cylinder, 7, and sufficiently long to span the compression chambers 8 and 9. In the middle of these arcuate portions, 28 and 29 are inset wall seals, 30, movable in the direction of the radial planes they intercept. On its front face, the rotor is journaled for intake ring seals, 31, urged outwardly by appropriate springs, 32. These seals flank an intake trench, 33, cut in the front face of the rotor, connected by an open passage, 34 to the periphery of the rotor where its grooved side 27 touches its arcuate end, 28. Likewise, on the back face, the rotor is journaled for exhaust ring seals 18, urged outwardly by appropriate springs, 23. These seals flank an exhaust trench, 16, cut in the back face of the rotor 24, connected by an open passage 35 to the periphery of the rotor where its tongued side, 26, touches its arcuate end, 28.

The rotor 24 is grooved on the front face for head slot seals 36, and on the back face for base slot seals, 37, also urged outward by springs and running diagonally from the largest ring seal 31 and 18, respectively, to the side of the wall seals, 30, and tapered at their inner end to allow for passing under the gate seals, 19.

Figure 8:
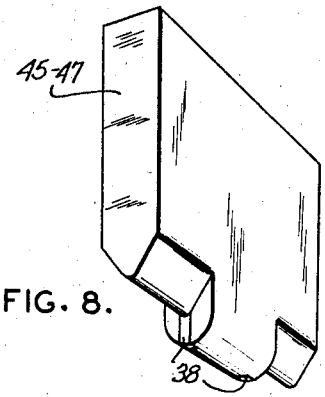
Fig. 8 is a perspective drawing of a tongued gate.
Figure 9:
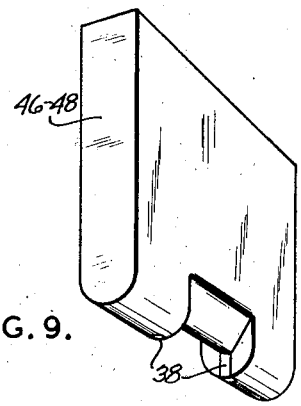
Fig. 9 is a perspective drawing of a grooved gate.

The gates are of two types, as shown in Fig. 8 and Fig. 9, the former being faced with a tongue designed to fit with appropriate clearance the groove 27 of the rotor, and the latter being grooved to fit correspondingly its tongue 26. The bearing edges of the tongue of the gate in Fig. 8 and its adjacent shoulders, as well as the groove of the gate in Fig. 9 and its adjacent shoulders, are arcuate surfaces of co-axial cylinders, to provide a seal with the tenoning faces of the rotor regardless of the angle at which they touch. The sides of the tongue of gate in Fig. 8 and the inner sides of the shoulders of gate in Fig. 9 are equipped with slot seals 38, urged outwardly and inwardly, respectively, by springs, 38s. Both gates are equipped with pockets, 39, for housing springs 40 which, when the engine is assembled, urge the gates down their respective courses against the edges of the rotor, 24. This urging is supplemented in operation by the action of the air compressed behind the gates in the courses.

When assembled, the cylinder 7 is enclosed by a head, 41, which, like the back face, is provided with a shaft bearing, 42, and an intake port, 43, open to the carburetor (not shown), and flat seals 19, urged inward by springs, 20. Although for simplicity this common device is not illustrated, the shaft is geared to a timing device for sparking the plugs (or injecting fuel in Diesel operation) at appropriate points in the rotation of the rotor.

Gate courses 12 and 14 house tongued gates 45 and 47, respectively, and gate courses 11 and 13 house grooved gates 46 and 48, respectively.

Figure 7:
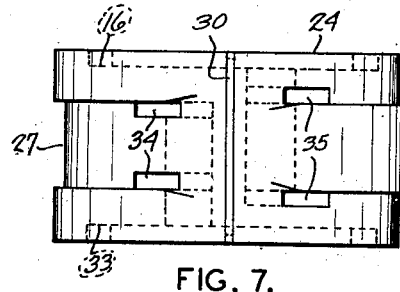
Fig. 7 is a view of the end of the rotor containing the exhaust and intake ports.

The terminations of the tongue, 26, and groove, 27, of the rotor, 24, are tapered inward and outward, respectively, as in Fig. 7 to compress the seals, 38 in the gates as they begin to seat.

Figure 2:
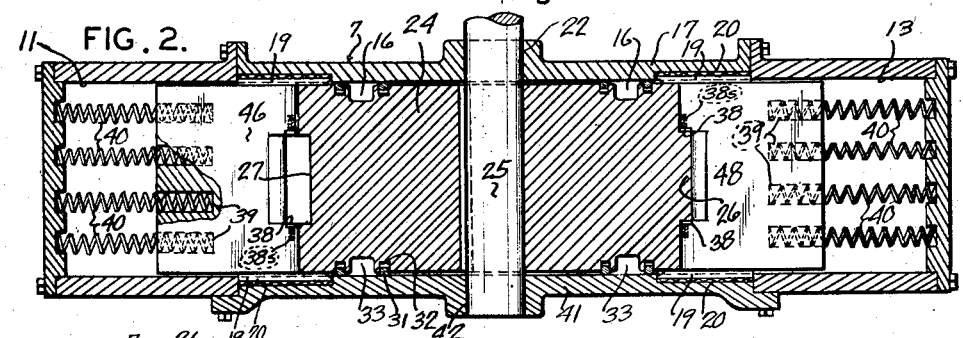
Fig. 2 is a section at right angles to the plane of Fig. 1 taken substantially along the line 2—2.
Figures 4, 5, 6:
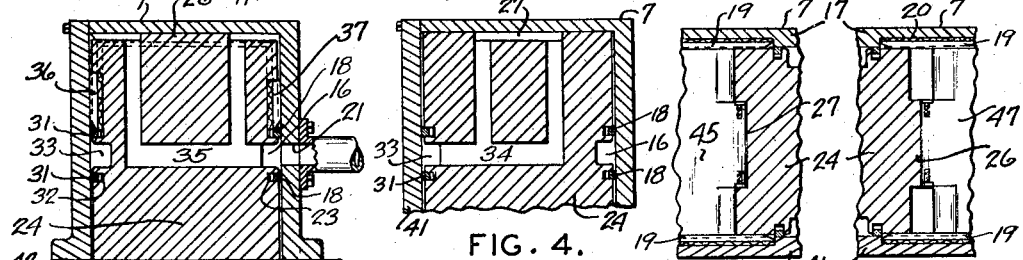
Fig. 4 is a similar section along the line 4—4 of Fig. 1.
Fig. 5 is a similar section along the line 5—5 of Fig. 1.
Fig. 6 is a similar section along the line 6—6 of Fig. 1.
Figure 3:
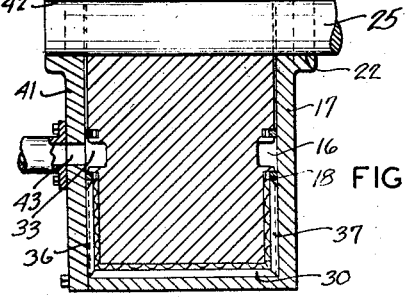
Fig. 3 is a similar section along the line 3—3 of Fig. 1.
Figure 10:
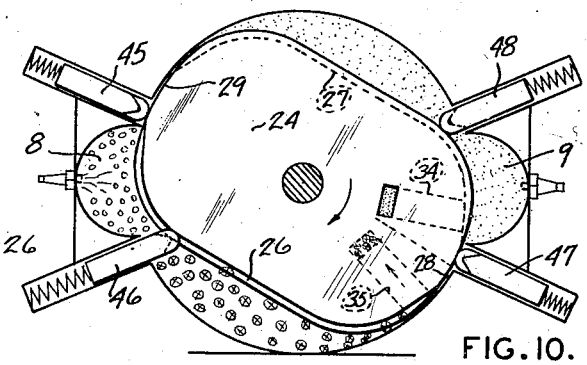
Figs. 10, 11, 12 are diagrammatic representations of the engine in operation, wherein dots represent the unexploded gas, circles the exploding gas, and crossed circles the exploded gas.
Figure 11:
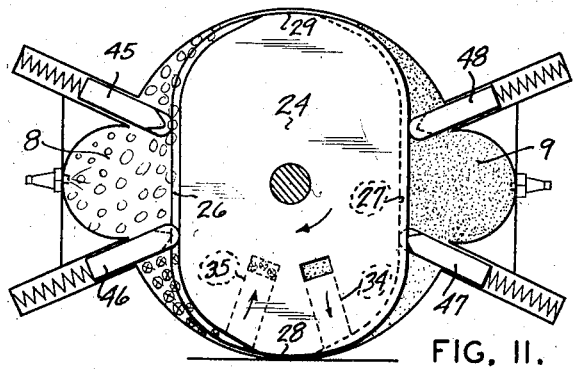
Figure 12:
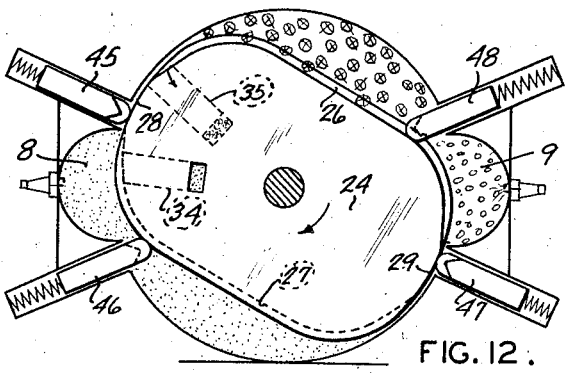

The operation of the device is as follows:
As the rotor revolves from the position of Fig. 1 to that of Fig. 10, a partial vacuum is created between gate 45, sealing as in Fig. 5, and the end 28 of the rotor 24, which can be satisfied only by drawing gas from the outside of the cylinder 7 through the opening 43 in the head, 41, the intake trench, 33, and intake tunnel 34. As the rotation proceeds to the position of Fig. 11, the charge is trapped between gate 47 sealing, as gate 45 seals, in Fig. 5, and the other end 29 of the rotor, 24. The grooved gate 48 not sealing with the grooved side, 27 of the rotor, 24, as in Fig. 2 gate 46 does not seal, the gas will be chased through the grooves to the compression chamber 9. When the chamber 9 is fully charged, the gas is fired as in Fig. 12. The tongued side 26 of the rotor now being in contact with grooved gate 48, causing a seal, as in Fig. 2, the gas can expand only by causing the rotor 24 to revolve clockwise through the position of Figure 1 and to the position of Fig. 10. In that position grooved gate 46 will seal with the tongued side 26 of the rotor, 24, as in Fig. 2 gate 48 seals, and the exhausted gas will be trapped between it and the end 28 of the rotor 24. As this end advances to the positions of Figs. 11 and 12, the exhausted gas will be compressed and must escape to the outside of the engine through exhaust tunnel 35, trench 16, and outlet 21, thus completing the cycle in two revolutions. But reference to Figs. 1, 10, 11, and 12 demonstrates that saving for the periods when the ends of the rotor 24 pass over the compression chambers 8 and 9, the four phases of intake, compression, power and scavenging are each taking place simultaneously, and that each phase occurs twice in each revolution: the power phases, for example, occurring in chamber 9 in Figs. 12 and 1 and in chamber 8 in Figs. 10 and 11.

No means of lubrication are considered in this specification, it being desired to make this as simple an application of the principle as possible, and it being contemplated that the lubrication of the interior of the motor will be achieved, as in two-cycle motors by mixing oil with the gasoline.

What I claim for this invention is:

1. In an internal combustion engine, a cylinder, a non-cylindrical rotor mounted for rotation therein and sealing with said cylinder at its opposite ends, said rotor having a groove on one side edge and a tongue on the other, ignition means at two opposite points on said cylinder, and a pair of sealing means adjacent to said ignition means, one of which has a tongue adapted to make contact with one rotor edge, and the other of which has a groove adapted to make contact with the other rotor edge.

2. In an internal combustion engine, a cylinder, an elongated rotor mounted for rotation therein, means sealing the ends of the rotor against the cylinder, opposed ignition means in the cylinder, a pair of sealing means adjacent to each ignition means, one side of said rotor having means adapted to seal with one of each pair of sealing means, and the other side of the rotor having means to seal with the other of each pair of sealing means.

3. In an internal combustion engine, a cylinder, ignition means in the cylinder, an elongated rotor mouted for rotation therein, sealing with the circumference of the cylinder at either end, and a pair of sealing means adjacent to the ignition means and movable to make contact with the rotor, one side of the rotor having means adapted to seal with one of said sealing means but not with the second, the other side of the rotor having means adapted to seal with the second of said sealing means, but not with the first and constantly open intake and exhaust ports in said rotor, on either side of one sealing end thereof.

4. In an internal combustion engine, a cylinder, a rotor therein having a compression area along one edge, a power area on another edge, and means between said areas at one end separating the same, a combustion chamber, reciprocating means adjacent to said chamber to prevent passage of gas therebeyond as said compression area successively passes said means, reciprocating means adjacent to said chamber to release said gas to the power area as the said area successively passes said means, and to restrict release of gas to such of said power area as has passed said means, a constantly open intake passage and a constantly open exhaust passage at the other end of the rotor, on the edge containing the compression area and on the edge containing the power area, respectively, and means between said passages separating the same.

5. In an internal combustion engine, a cylinder, a rotor therein having a compression area along one edge, a power area on another edge, and means at one end separating said areas, a combustion chamber, means adjacent to said chamber and beyond the same in the direction of rotation to seal against the compression area of the rotor but not the power area, and means adjacent to said chamber and ahead of the same in the direction of rotation to seal against the power area but not the compression area, an exhaust port adjacent to the other end of the rotor on the power area edge, and an intake port adjacent to the other end of the rotor on the compression area edge and means separating the same.

6. In an internal combustion engine, a cylinder, an elongated rotor containing exhaust and intake ports separated by a portion of the rotor bearing on the cylinder adapted to rotate in one direction in said cylinder, ignition means in said cylinder, slides on said cylinder, one on each side of each ignition means, capable of seating on the rotor, and means for seating only one of said slides at each ignition means while one side of the rotor is thereunder, and for seating only the other of said slides while the other side of the rotor is thereunder.

7. In an internal combustion engine, a cylinder, an elongated rotor mounted for rotation in one direction in said cylinder and sealing therewith at its ends, a pair of ignition means at opposite points on said cylinder, two pairs of slides on said cylinder, there being one slide adjacent to each side of each ignition means, said rotor having means on one side to seal with the first of said slides but not with the second, and having means on the other side to seal with the second but not with the first, said rotor having an exhaust passage at one end on the first side, and an intake passage at the same end on the second side.

8. In an internal combustion engine, a plurality of firing chambers, a rotor having a number of sides equal to the number of firing chambers, a pair of valve means on opposite sides of each firing chamber and adapted to make contact with the rotor, adjacent sides of said rotor having different edge contours, and one of said valve means having a complementary contact surface for one edge contour of the rotor but not the adjacent such contour, the other valve means having a contact surface complementary to said adjacent edge contour but not to the first, so mounted that the said valve means will seal each firing chamber at certain points in rotation with the part of the rotor approaching the said firing chamber, and at other points in rotation with that part of the rotor retreating from the firing chamber.

9. In an internal combustion motor composed of a non-cylindrical body rotating with respect to a cylindrical body, a plurality of firing chambers on the cylinder each flanked with a pair of sealing means bearing on the non-cylindrical body, the first of every such pair being similar in contour of bearing face, and the second of every such pair being so similar, but the first of each pair being so dissimilar from the second of each pair; the non-cylindrical body having as many faces and also as many ridges between faces, sealing with the cylinder, as there are firing chambers, every odd face being contoured complementarily with the first of each pair of sealing means and every even face being contoured complementarily with the second of each sealing means, having ports for exhaust and intake on the leading and following sides, respectively, of every other such sealing ridge, connected by appropriate passage to the outside of the motor, so that the exhaust port appears on the faces contoured complementarily with the first of each pair of sealing means and the intake port appears on the faces contoured complementarily with the second of each pair of sealing means, with appropriate ignition means adjusted to fire the charge in each firing chamber when the ridges not adjoined by the ports pass thereunder.

10. In an internal combustion engine, a plurality of firing chambers, a rotor having a number of sides equal to the number of firing chambers, a pair of valve means on opposite sides of each firing chamber and adapted to bear on the rotor, adjacent sides of the rotor having different edge contours and one of said valve means having a complementary contact surface for one edge contour of the rotor but not the adjacent such contour, the other valve means having a contact surface complementary to said adjacent edge contour, but not to the first, the parts of said rotor between such adjacent sides sealing against the circumference of said cylinder, the whole so mounted that as one part of said rotor sealing with the cylinder wall passes each firing chamber the pair of valve means will successively seal the firing chamber with the part of the rotor approaching the said firing chamber, and then with that part of the rotor retreating from the firing chamber, and that as the successive part of the rotor sealing with the cylinder wall passes the same firing chamber the pair of valve means will successively seal the firing chamber from the part of the rotor approaching the said firing chamber, and then from that part of the rotor retreating from the firing chamber.

11. In an internal combustion engine composed of a body rotating with respect to a cylindrical body, two reciprocating sealing means in the cylindrical body bearing on the faces of the other body, said faces, and the bearing surfaces of said sealing means being of such profile in section when plane of section includes the axis that one face will fit and hence seal with the second sealing means but not with the first, and that another face will fit and hence seal with the first sealing means but not with the second.

12. In a rotatable device, sealing means, the borne edge of which is so designed with the bearing surface passing over it that where the two surfaces are complementary in section when plane of section includes the axis they will seal, and where they are not, they will not seal.

13. A reciprocating valve sealing against the edge of a rotating body at various angles, and having on the borne edge more than one surface, the borne edge of which is so designed that all sections thereof, taken parallel to the plane of rotation, are arcs of the same or co-axial cylinders.

14. In an internal combustion engine composed of a non-cylindrical body rotating with respect to a cylindrical body flanked with firing chambers each adjoined by abutments periodically sealing with the non-cylindrical body, said non-cylindrical body sealing with the circumference of the cylindrical body on portions of its periphery, and having constantly open intake and exhaust ports on either side of every alternate such portion of the non-cylindrical body, means for preventing the sealing of abutments on an arc of the cylindrical body between two such chambers while the sealing portions of the non-cylindrical body which are not adjoined by such ports pass between them.

LON HOCKER, JR.